US006886172B2

(12) United States Patent
Sanchez, II

(10) Patent No.: US 6,886,172 B2
(45) Date of Patent: Apr. 26, 2005

(54) METHOD FOR MAPPING PROCEDURAL C++ CODE TO JAVA OBJECT-ORIENTED CLASSES

(75) Inventor: Humberto A. Sanchez, II, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 744 days.

(21) Appl. No.: 09/827,033

(22) Filed: Apr. 5, 2001

(65) Prior Publication Data

US 2004/0216146 A1 Oct. 28, 2004

(51) Int. Cl.[7] .............................................. G06F 9/00
(52) U.S. Cl. ..................................... 719/328; 719/315
(58) Field of Search ................................ 719/328, 315, 719/316, 330; 717/116, 165, 137; 709/203; 345/744; 707/103 XY

(56) References Cited

U.S. PATENT DOCUMENTS

| | | | | |
|---|---|---|---|---|
| 5,475,845 A | * | 12/1995 | Orton et al. ................ 719/328 |
| 5,732,270 A | * | 3/1998 | Foody et al. ............... 719/316 |
| 5,761,656 A | * | 6/1998 | Ben-Shachar ................ 707/4 |
| 5,903,269 A | * | 5/1999 | Poreh et al. ................ 345/804 |
| 6,066,181 A | * | 5/2000 | DeMaster ................... 717/148 |
| 6,085,030 A | * | 7/2000 | Whitehead et al. .......... 709/203 |
| 6,510,550 B1 | * | 1/2003 | Hightower et al. .......... 717/108 |
| 6,542,900 B1 | * | 4/2003 | Xia ....................... 707/103 Y |
| 6,609,158 B1 | * | 8/2003 | Nevarez et al. ............. 719/316 |
| 2002/0174161 A1 | * | 11/2002 | Scheetz et al. ............. 709/100 |
| 2004/0015849 A1 | * | 1/2004 | Sanchez, II ................ 717/116 |

OTHER PUBLICATIONS

Java Native Interface Specification, JavaSoft, May 1997.*
R. Loon, "Callback Functions: The Heart of Every GUI's API", C++ Report,Nov. 1994.*
Twinpeaks White Paper: Bring Together C++ and Java, May 1996, www.ilog.com/html/about.sub.-twinpeaks.sub-.-white.subpaper.html.*
Rob Gordon, Java and C + + , Prentice Hall, ISBN 0–13–679895–0, Chapter 9, pp. 151–181, 1998.

* cited by examiner

Primary Examiner—Sue Lao

(57) ABSTRACT

A method and apparatus for mapping of procedural code to object-oriented classes is disclosed. A mapping layer in an object-oriented programming language process space that maps procedural method calls to object-oriented class instantiations and remote method invocations according to an embodiment of the present invention is disclosed. The mapping layer preferably is utilized for accomplishing persistent changes to the object-oriented classes. The mapping layer preferably comprises entry-points that are methods, which may be invoked by procedural graphical user interface callback code.

15 Claims, 7 Drawing Sheets

METHOD FOR MAPPING PROCEDURAL C++ CODE TO JAVA OBJECT-ORIENTED CLASSES

FIELD OF THE INVENTION

The invention relates to programming language interactions, and more specifically to legacy C++ GUI interactions with a Java environment.

BACKGROUND OF THE INVENTION

In many software systems today, the existing or legacy graphical user interfaces ("GUIs") are coded in C++. Over the past few years, however, Java® has become the programming language of choice. In order to use Java for providing the functionality of a system, the C++ GUIs must be made useable with Java. One alternative is to rewrite all of the lines of C++ code in Java. Rewriting the C++ code may comprise rewriting many lines of code. In many situations this is impractical. Furthermore, in many situations, it is desirable to maintain the C++ GUIs, instead of replacing them, and to use them to interface Java objects and methods of the Java functional code.

However, although generally an object-oriented language, C++ is a procedural language in that it can implement procedural interfaces while Java is an object-oriented language. Object-oriented programming is a method of programming that pairs programming tasks and data into re-usable chunks known as objects. Each object comprises attributes (i.e., data) that define and describe the object. Java classes are meta-definitions that define the structure of a Java object. Java classes when instantiated create instances of the Java classes and are then considered Java objects. Methods within Java objects are called to get or set attributes of the Java object and to change the state of the Java object. Associated with each method is code that is executed when the method is invoked.

A task that is a sequence of steps in a C++ implementation likely involves the creation and/or manipulation of multiple objects in a Java implementation. Moreover, some tasks may require a remote method invocation ("RMI"). Unfortunately, coding Java object-creation or RMIs in C++ can be quite cumbersome. If C++ GUIs are maintained for accessing a Java implementation, the cumbersome coding of the tasks involving Java object-creation and RMIs will clutter the C++ GUIs.

A solution to this problem would simplify the C++ GUI code by having Java object creation occur in Java. A solution would simplify access to first-class objects of the Java implementation and provide a simple access to RMIs. A solution would allow simple C++ GUI callback code for creating and accessing Java objects.

SUMMARY OF THE INVENTION

The present invention comprises a method and apparatus that maps procedural C++ code to Java object-oriented classes. A software component according to an embodiment of the invention is an Objectifier that is coded to call Java methods and make RMI calls as necessary to create and access Java objects in order to perform certain actions requested by C++ GUIs. The Objectifier is preferably a static Java class comprising a series of pass-through interfaces that may be accessed by executing simple C++ GUI callbacks.

When a C++ GUI executes callback code to access a pass-through interface or entry-point, the Objectifier preferably executes Java method call(s) and/or RMI(s), associated with the entry-point, in order to perform the requested action. These entry-points thus map the procedural C++ code to the object-oriented Java code necessary to perform the action. The Objectifier preferably consolidates the Java object creations and RMIs that are used to conduct a process in Java. The C++ GUI callbacks may access the Objectifier directly through Java Native Interface ("JNI") Application Programming Interface ("API") calls or through method calls to a C++ proxy of the Objectifier. The C++ proxy of the Objectifier preferably includes a one-to-one mapping of Objectifier methods as well as the necessary coding to make JNI API calls to the Objectifier.

A method according to an embodiment preferably comprises a user starting a C++ GUI in order to access a Java-based system, initializing a mapping layer (e.g., the Objectifier), executing a C++ GUI callback, the mapping layer receiving a method call through an entry-point, the mapping layer executing an algorithm comprising a class instantiation and/or a RMI as determined by the entry-point, and if necessary, returning data to a C++ process space.

These and other advantages are achieved by a method for mapping procedural code to object-oriented classes comprising, starting a graphical user interface ("GUI") in a procedural programming language process space, wherein a user enters a command through the GUI, initializing a mapping layer in an object-oriented programming language process space, wherein the mapping layer comprises entry-points that have corresponding algorithms that invoke object-oriented class instantiation methods and remote method invocations ("RMIs"), executing a GUI callback in response to the command, wherein the GUI callback comprises procedural code and wherein executing a GUI callback in response to the command comprises invoking one of the entry-points, and the mapping layer executing an algorithm corresponding to the invoked entry-point.

Likewise, these and other advantages are achieved by a computer system that enables the mapping of procedural code to object-oriented classes comprising a memory, a processor that runs an application, wherein the application generates a graphical user interface ("GUI") in a procedural programming language process space, wherein users enter commands through the GUI, and, a mapping layer in an object-oriented programming language process space, wherein the mapping layer comprises entry-points that have corresponding algorithms that invoke object-oriented class instantiation methods and remote method invocations ("RMIs").

These and other advantages are achieved by a computer readable medium containing instructions for mapping procedural code to object oriented classes, by starting a graphical user interface ("GUI") in a procedural programming language process space, wherein a user enters a command through the GUI, initializing a mapping layer in an object-oriented programming language process space, wherein the mapping layer comprises entry-points that have corresponding algorithms that invoke object-oriented class instantiation methods and remote method invocations ("RMIs"), executing a GUI callback in response to the command, wherein the GUI callback comprises procedural code and wherein executing a GUI callback in response to the command comprises invoking one of the entry-points, and the mapping layer executing an algorithm corresponding to the invoked entry-point.

DETAILED DESCRIPTION OF THE INVENTION

Figure 1:
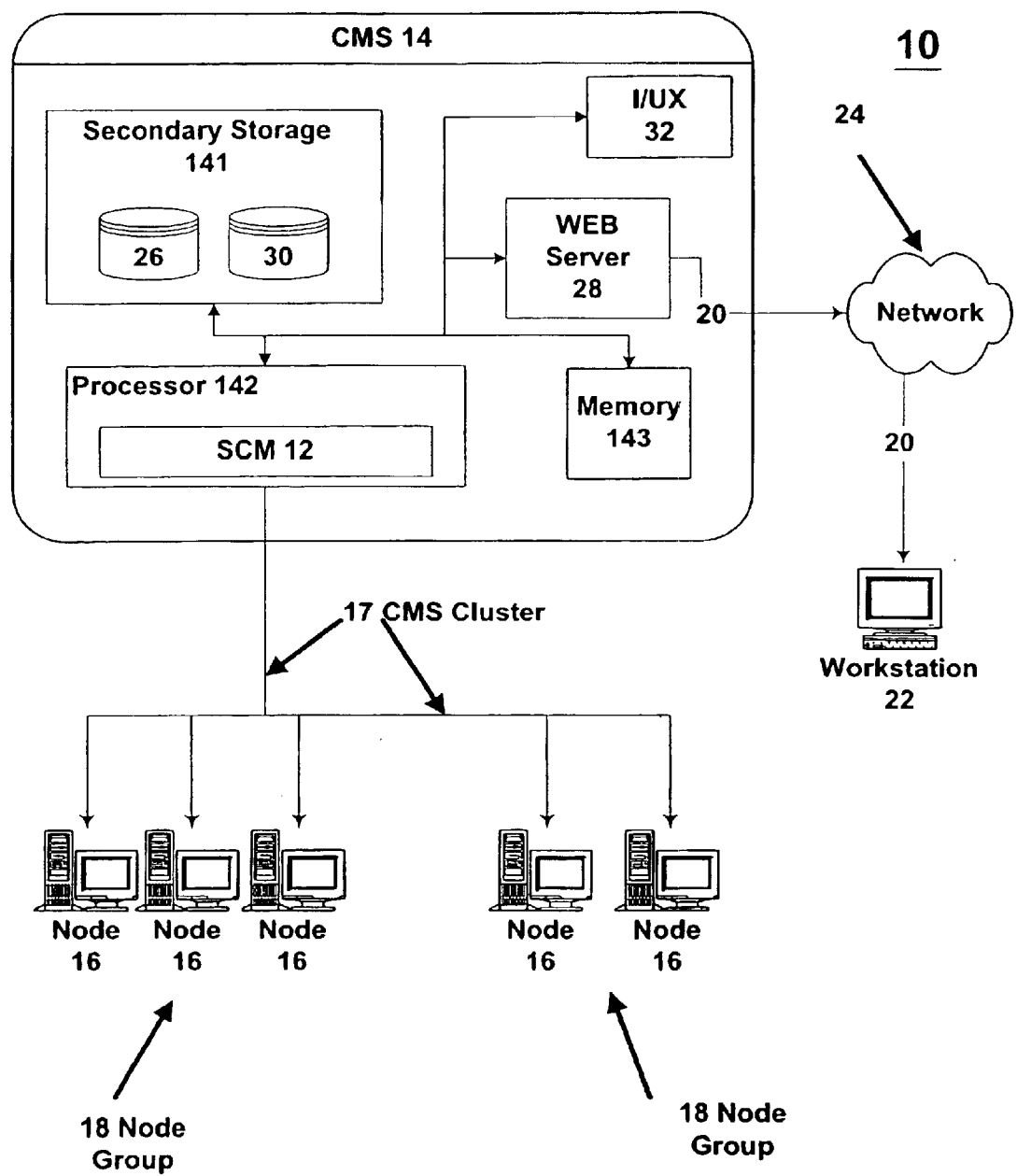
FIG. 1 is a block diagram of a computer system on which an embodiment of a mapping layer may be run.

The mapping layer may be used with computer systems that utilize C++ graphical user interfaces ("GUIs") to access Java objects across a Java Native Interface ("JNI"). FIG. 1 illustrates a computer network system 10 with which the present invention may be used. The network system 10 comprises a ServiceControl Manager ("SCM") 12 running on a Central Management Server ("CMS") 14 and one or more nodes 16 managed by the SCM 12 on the CMS 14. Together the one or more nodes 16 managed by the SCM 12 make up a SCM cluster 17. A group of nodes 16 may be organized as a node group 18.

The CMS 14 preferably is an HP-UX 11.x server running the SCM 12 software. The CMS 14 includes a memory 143, a secondary storage device 141, a processor 142, an input device (not shown), a display device (not shown), and an output device (not shown). The memory 143, a computer readable medium, may include, RAM or similar types of memory, and it may store one or more applications for execution by processor 142, including the SCM 12 software. The secondary storage device 141, a computer readable medium, may include a hard disk drive, floppy disk drive, CD-ROM drive, or other types of non-volatile data storage. The processor 142 executes the SCM 12 software and other application(s), which are stored in memory 143 or secondary storage 141, or received from the Internet or other network 24, in order to provide the functions and perform the methods described in this specification, and the processing may be implemented in software, such as software modules, for execution by the CMS 14 and modes 16. The SCM 12 is programmed in Java® and operates in a Java® environment that is preferably accessed by using legacy C++ GUIs and the present invention. See *Service Control Manager Technical Reference*, HP part number: B8339-90019, which is hereby incorporated by reference and which is accessible at http://www.software.hp.com/products/scmgr, for a more detailed description of the SCM 12.

Generally, the SCM 12 supports managing a single SCM cluster 17 from a single CMS 14. All tasks performed on the SCM cluster 17 are initiated on the CMS 14 either directly or remotely, for example, by reaching the CMS 14 via a web connection 20. Therefore, a workstation 22 at which a user sits only needs a web connection 20 over the network 24 to the CMS 14 in order to perform tasks on the SCM cluster 17. The workstation 22 preferably comprises a display, a memory, a processor, a secondary storage, an input device and an output device. In addition to the SCM 12 software and the HP-UX server described above, the CMS 14 preferably also comprises a data repository 26 for the SCM cluster 17, a web server 28 that allows web access to the SCM 12 and a depot 30 comprising products used in the configuring of nodes, and a I/UX server 32.

The nodes 16 are preferably HP-UX servers or other servers and they may be referred to as "managed nodes" or simply as "nodes". The concept of a node 16 is that it represents a single instance of HP-UX running on some hardware. The node 16 may comprise a memory, a secondary storage device, a processor, an input device, a display device, and an output device.

Although the CMS 14 is depicted with various components, one skilled in the art will appreciated that this server can contain additional or different components. In addition, although aspects of an implementation consistent with the present invention are described as being stored in memory, one skilled in the art will appreciated that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling the CMS 14 (and/or the nodes 16) to perform a particular method, such as those described herein.

Figure 2A:
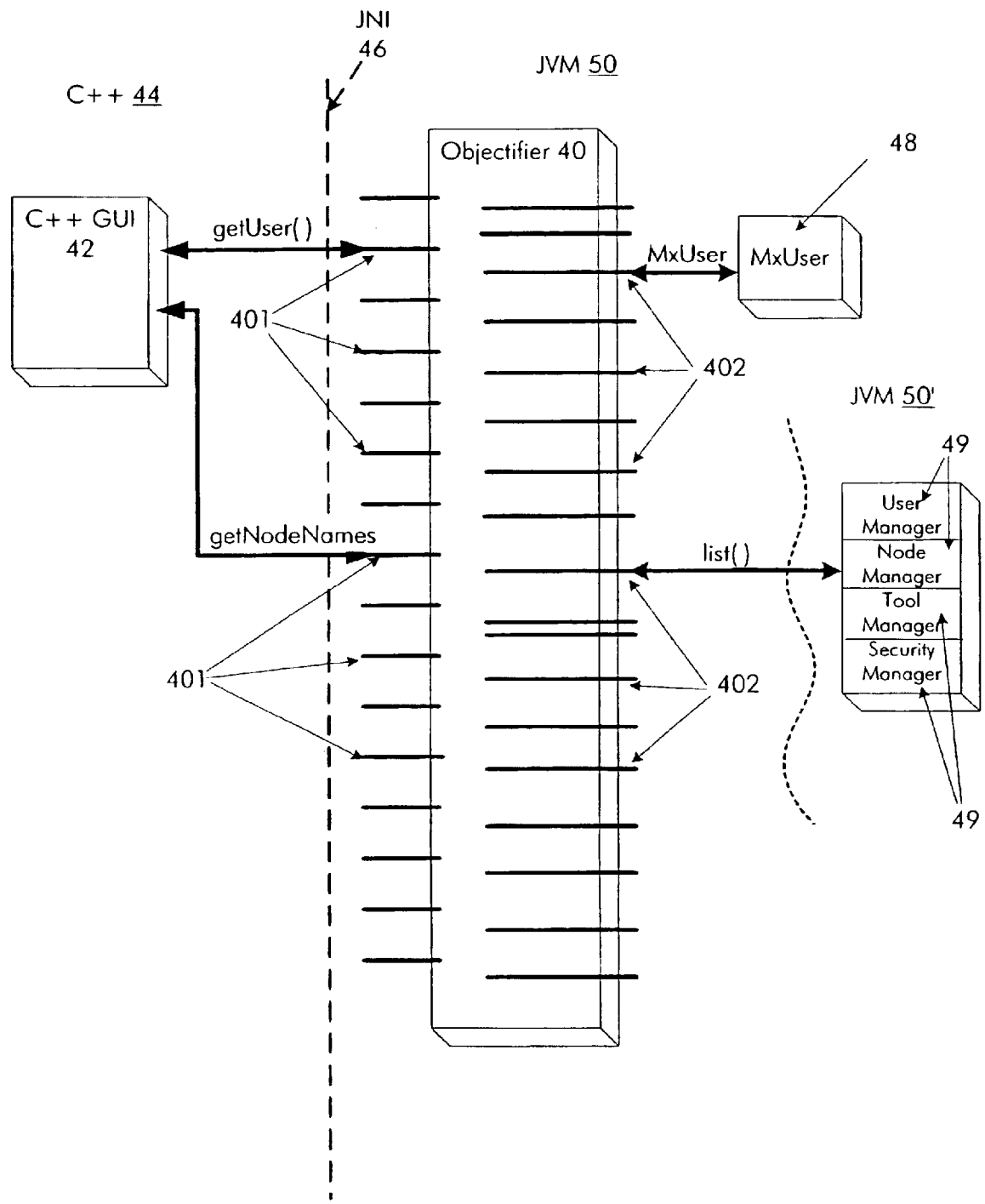
FIGS. 2a and 2b are block diagrams conceptually illustrating an embodiment of the mapping layer and operation of the mapping layer.

FIG. 2a conceptually illustrates an Objectifier 40 and operation of the Objectifier 40 according to the present invention. FIG. 2a shows a C++ GUI 42 in a C++ process space 44, a Java Native Interface ("JNI") 46 and the Objectifier 40 and a plurality of instantiated Java classes (as known as objects) 48 in a Java Virtual Machine ("JVM") 50, the Java process space.

In the system 10, each user, node, node group, role, tool, authorization, user name, node name, and node group name is, for each instance, represented by a single Java object. A role defines the role (e.g., administrator, database manager, web manager, etc.) a user may have on a certain node(s) or node group(s), where each role has one or more tools associated with it that a user with the role may execute. A tool is an executable that performs some process. An authorization defines the node(s) and node group(s) a user is authorized to access and what roles the user has on the authorized node(s) or node group(s).

When the attributes of any of the above (i.e., user, node, node group, etc.) are changed or need to be accessed, the representative Java object is instantiated and a mutator (e.g., set) or accessor (e.g., get) method of the representative Java object is invoked to change the object's attributes. When a new user, node, node group, etc. is added, a new, empty representative Java object is instantiated and then populated with the new user, node, node group, etc. attributes. Accordingly, an action that may be accomplished as simply a process of steps in a C++, may involve numerous object instantiations and method invocations in Java.

The Objectifier 40 is a mapping layer between procedural C++ GUI 42 callbacks in the C++ process space 44 and object-oriented Java implementation in the JVM 50. C++ GUI 42 callbacks are the code that a C++ GUI 42 executes to perform a function requested by a user input to the C++ GUI 42. Associated with each C++ GUI 42 input, generally, is one portion of callback code. However, each callback code may comprise a multiple step process.

Preferably, the Objectifier 40 is a singleton utility class with static methods, and therefore exists as only one instance per JVM 50. The Objectifier 40 preferably is a single threaded interface. Preferably, the Objectifier 40 is used to make persistent changes (e.g., create a new user, delete a user, store a user, store a node, create a node, create an authorization, store an authorization, or execute a tool as an instance of a task, etc.). As such, the Objectifier 40 static methods preferably execute the class instantiations and RMIs necessary to accomplish these persistent changes.

As a mapping layer between procedural C++ GUI 42 callbacks and the object-oriented Java implementation, the Objectifier 40 comprises a series of pass through interfaces or entry-points 401 for the procedural C++ GUI 42 callbacks. Each entry-point 401 is preferably an Objectifier 40 static method that may be invoked by at least one executed C++ GUI 42 callback. The entry-points 401 map to the Java object-oriented coding necessary to perform an action. As depicted in FIG. 2a, when a user wants to perform some action (e.g., create a new user object), a callback is executed and a method call (e.g., addUser( )) is issued to the Objectifier 40. The method call passes to the Objectifier 40 through an entry-point 401 corresponding to the invoked method.

As shown above, performing a task (e.g., adding a user) in the JVM 50 may not simply be a sequence of procedural steps as it would be in a C++ implementation. Rather, one or more classes may need to be instantiated as objects 48 (e.g., a new user object needs to be created) in order to perform the task. For example, in order to create a new user object in the SCM 12 described above, the nodes, node groups, tools and roles that the new user is authorized to access may need to be determined. Consequently, certain utility classes (e.g., object managers 49 that are used to access and manage the objects 48) may need to be accessed via a Remote Method Invocation ("RMI"). An RMI is used to access an object in a different JVM 50'. The object managers 49 may be housed in a domain manager (not shown) that is a module of the SCM 12 software that preferably runs on the CMS 14.

Coding Java class instantiations, let alone a multiple-class instantiating process, is cumbersome in C++. The coding involves cluttering the C++ GUI 42 callback code with the awkward procedural C++ implementation of an object-oriented process. Moreover, for many steps of the process, the C++ GUI 42 would have to instantiate a plurality of objects 48 in the JVM 50 through the JNI 46. Further, the C++ GUI 42 would have to accomplish RMIs through the JNI 46, a difficult and cumbersome requirement.

Instead, the Objectifier 40 is coded with the necessary class instantiation(s) and RMIs 402 for performing the actions that may be requested by the C++ GUI 42 callback code. Accordingly, associated with each entry-point 401 is the necessary class instantiation(s) and/or RMI(s) 402 for performing the action requested by the C++ GUI 42 method call corresponding to that entry-point 401, as depicted in FIG. 2a. Therefore, the C++ GUI 42 callback code is not cluttered with awkward C++ creation of Java objects and awkward Java RMIs. Moreover, the Objectifier 40 consolidates all of the class instantiations and RMIs in a single Java class so that the C++ GUI 42 method calls need be made to only a single Java class, the Objectifier 40.

Consequently, a C++ GUI 42 method call to the Objectifier 40 triggers the execution of the object-oriented Java implementation of a requested action. The C++ GUI 42 method call need only invoke the Objectifier 40 method for the requested action in order to enter the Objectifier 40 through the correct entry-point 401. For example, in order to store a newly-created user, the C++ GUI 42 may execute a callback that invokes the Objectifier 40 method addUser( ). This method call 'enters' the Objectifier 40 through an addUser( ) entry-point 401, triggering execution of the necessary RMI to store the new user object, as shown in FIG. 2a. Since invocation of the Objectifier 40 method triggers the object-oriented process, the C++ GUI 42 callback code need not include Java object calls or RMIs 402.

Figure 2B:
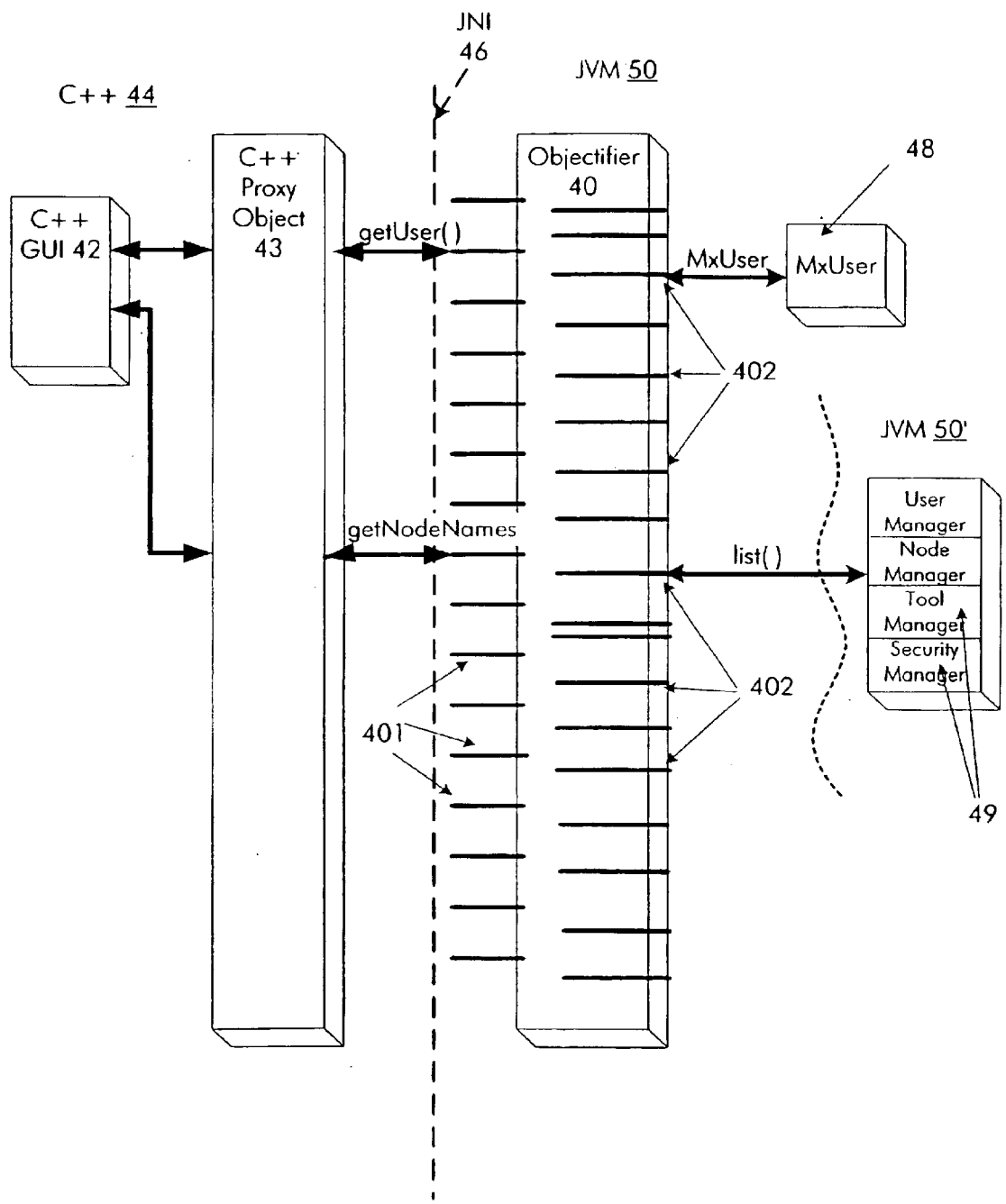

FIG. 2b conceptually illustrates an alternative embodiment. In the embodiment shown in FIG. 2b, the Objectifier 40 is proxied by a C++ proxy object 43. The C++ proxy object 43 preferably comprises methods that correspond to all of the methods of the Objectifier 40 and coding necessary to invoke the Objectifier 40 methods across the JNI 46. The coding necessary to invoke the Objectifier 40 methods across the JNI 46 includes JNI Application Programming Interface ("API") calls.

In the embodiment shown in FIG. 2b, the C++ GUI 42 callbacks execute the C++ proxy object 43 methods corresponding to the desired Objectifier 40 methods, and the C++ proxy object 43 in turn executes the JNI API calls necessary to invoke the desired Objectifier 40 methods. Consequently, the JNI API calls are transparent to the C++ GUIs 42 and the C++ GUI 42 callback code is not cluttered with coding necessary for the JNI API calls. In the methods and sequence diagrams discussed below, the Objectifier 40 method invocations may be made by executed C++ GUI 42 callback code or by the C++ proxy object 43 shown in FIG. 2b.

Some of the objects and classes discussed herein are named with a prefix "mx". The mx prefix is indicative of the application utilizing the objects and classes (e.g., the SCM 12) and is merely exemplary. Indeed, the names of classes, objects and methods discussed herein are exemplary, are not intended to be limiting, and are merely used for ease of discussion.

Figure 3:
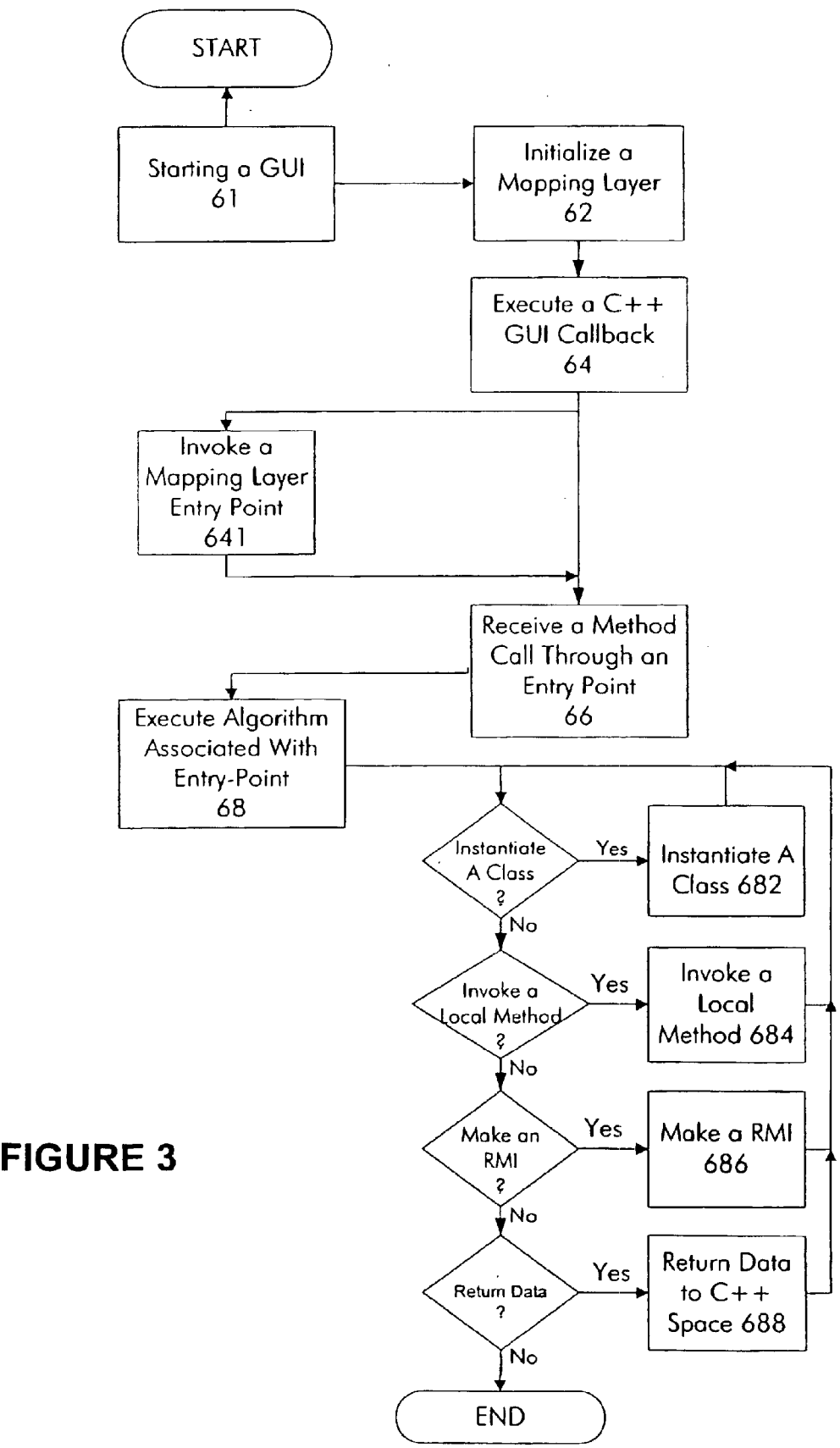
FIG. 3 is a flowchart illustrating a method of mapping procedural code to object-oriented classes.

FIG. 3 illustrates a process for mapping procedural C++ code to Java object-oriented classes 60 according to the present invention. The process 60 comprises starting a GUI 61, initializing a mapping layer (e.g., the Objectifier 40) 62, executing a GUI callback 64, invoking one of the entry-points 66 and the mapping layer executing an algorithm as determined by the entry-point 68.

Starting a GUI 61 preferably comprises a C++ GUI 42 being started-up so that a user may enter commands through the C++ GUI 42. For example, the C++ GUI 42 may be run on a workstation so that the user may access the system 10 and the functionality of the SCM 12. When the C++ GUI 42 is started, it is preferably displayed to the user on a display so that the user may interact with the C++ GUI 42, making selections and entering commands with an input device such as a mouse or a keyboard.

Initializing the mapping layer 62 preferably comprises instantiating the Objectifier class so that an instance of the Objectifier 40 object is present in the JVM 50 with which the C++ GUI 42 interacts. A C++ GUI 42 may initialize the mapping layer 62 early during the C++ GUI 42 startup code sequence. A C++ GUI 42 startup code sequence is run when a user starts a C++ GUI 42 in order to access the SCM 12.

Executing a C++ GUI callback 64 preferably comprises the C++ GUI 42 executing callback code, in response to a command entered by a user, to issue a method call to the JVM 50 in which the Objectifier 40 has been initialized. The method call preferably comprises a requested action and invokes a mapping layer entry-point 641 (e.g., invokes an Objectifier 40 method). For example, in the system 10 described above, the requested action may comprise retrieving, adding, deleting or storing a user, node, node group, tool, role, authorization, determining validity of node, node group, tool or role name, determining if user, node name, etc is defined, etc. Accordingly, in the system 10, the executed callback may make a method call invoking, for example, Objectifier 40 methods such as addUser, deleteNode, modifyNodeGroup, runTool, getAuthorization, isValidToolName, etc.

The mapping layer receiving a method call through an entry-point 66 preferably comprises the Objectifier 40 receiving the C++ GUI 42 method call after the method call has passed through the JNI 46. The Objectifier 40 method invoked by the method call is the entry-point of the C++ GUI 42 method call. The Objectifier 40 methods preferably comprise code comprising class instantiations and/or a RMI (s). Some Objectifier 40 methods may comprise code invoking local Java methods (i.e., in Java classes in the same JVM 50 as the Objectifier 40). Accordingly, the mapping layer executing an algorithm (comprising a class instantiation and/or a RMI) as determined by the entry-point 68 preferably comprises the Objectifier 40 executing the invoked method, which in turn executes the code associated with the executed method.

Consequently, as shown in FIG. 3, the mapping layer executing an algorithm associated with the entry-point 68 may comprise instantiating a class (i.e., Java object 48 creation) 682, invoking a local Java method 684 and/or making an RMI 686. If the C++ GUI 42 requires data to be returned (e.g., the executed callback requires a list of nodes to be displayed to the user for selection), executing an algorithm associated with the entry-point 68 further comprises returning data to the C++ process space 688.

Figure 5:
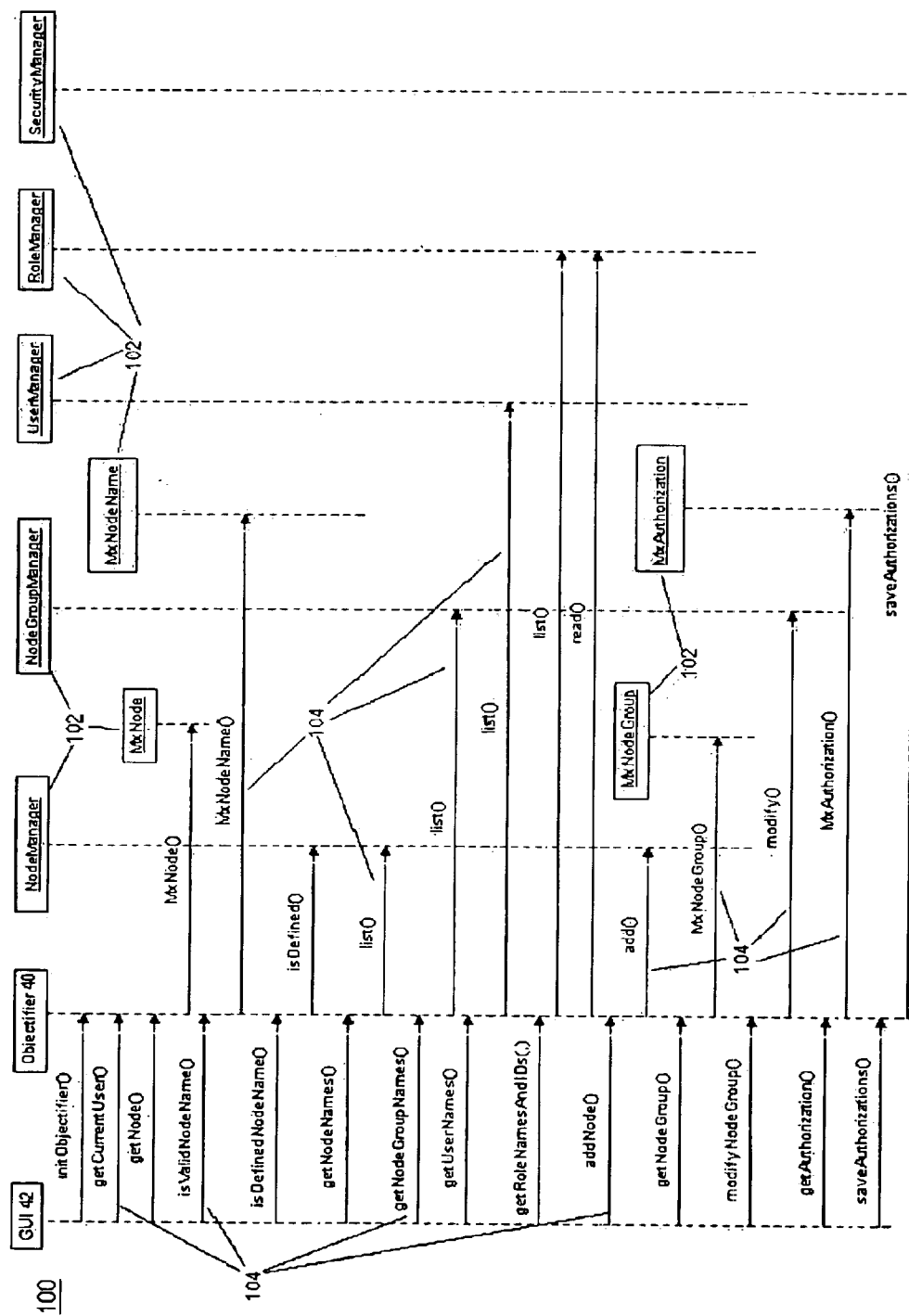
FIG. 5 is a sequence diagram illustrating an exemplary operation of the mapping layer.
Figure 6:
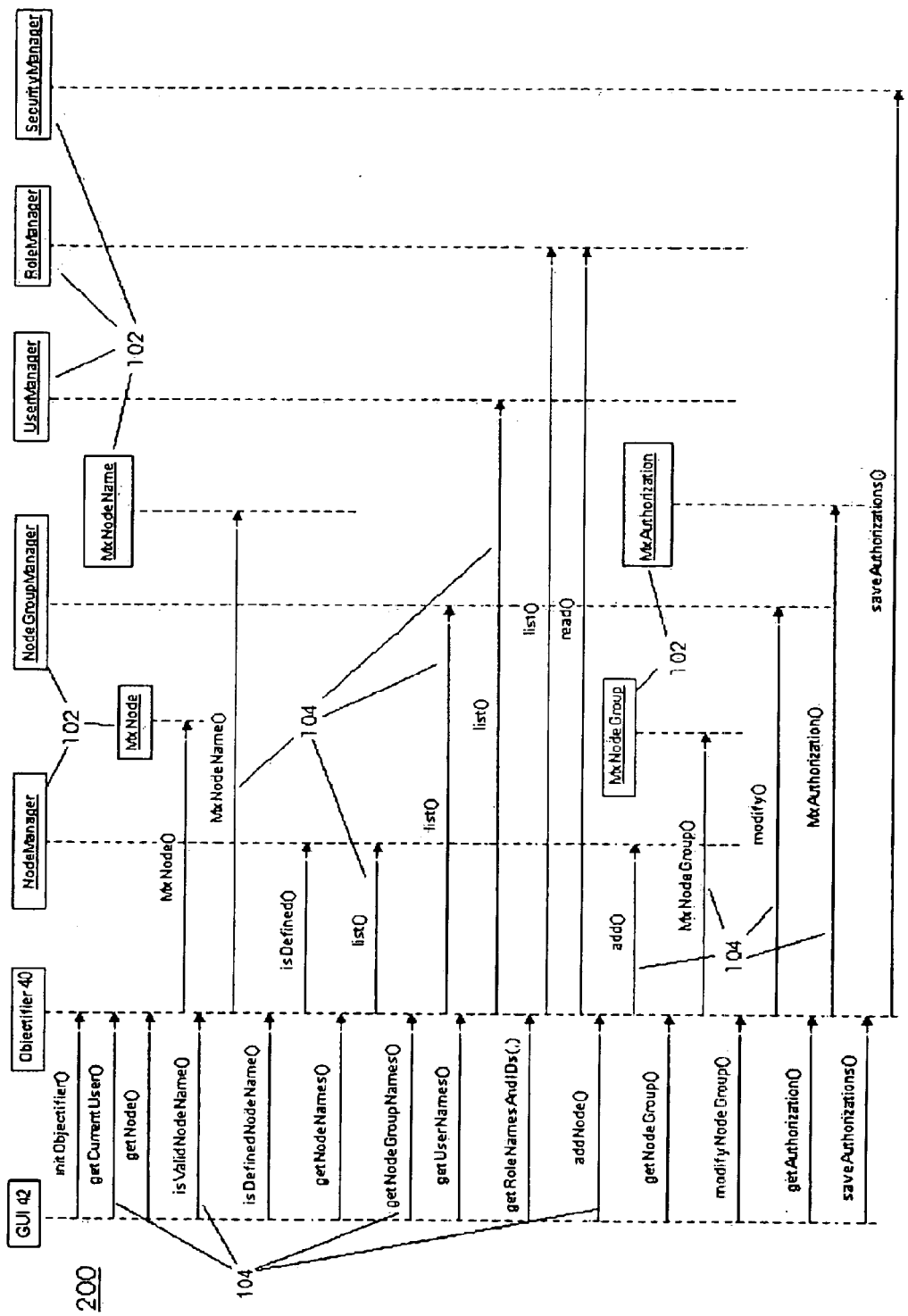
FIG. 6 is a sequence diagram illustrating an exemplary operation of the mapping layer.

Returning data to the C++ process space 688 may comprise returning a pointer to, or the actual value of, data such as an Integer, Long, String, Boolean, etc. that provides a value requested by the C++ GUI 42 method call. For example, if the C++ GUI 42 method call asks for a list of nodes, Node Name Strings may be returned. Returning data to the C++ process space 70, however, may also comprise returning a Java object 48 to the C++ process space 44. Returning a Java object 48 to the C++ process space 44 may comprise passing the Java object 48 name and instance data (i.e., data that describes the Java object 48) so that the Java object 48 can be proxied in the C++ process space 44. Exemplary execution of steps 682–688 is illustrated in FIGS. 5 and 6, described below. As shown in FIG. 3, step 682, step 684, step 686 and step 688 may be repeated if the method's algorithm requires a plurality of class instantiations, Java method calls and/or RMIs.

As noted above, the Objectifier 40 is coded with the entry-points 401 (i.e., methods) and corresponding methods as necessary to consolidate the class instantiations, Java method calls, and RMIs for performing the actions that may be requested by executed C++ GUI 42 callbacks. Consequently, the Objectifier 40 may be customized according to the system in which it is utilized. In a system different from the computer system 10 shown in FIG. 1, different methods may be required in the Objectifier 40. The methods in the Objectifier 40 may be modified or removed, and new methods may be added, as required.

Figure 4:
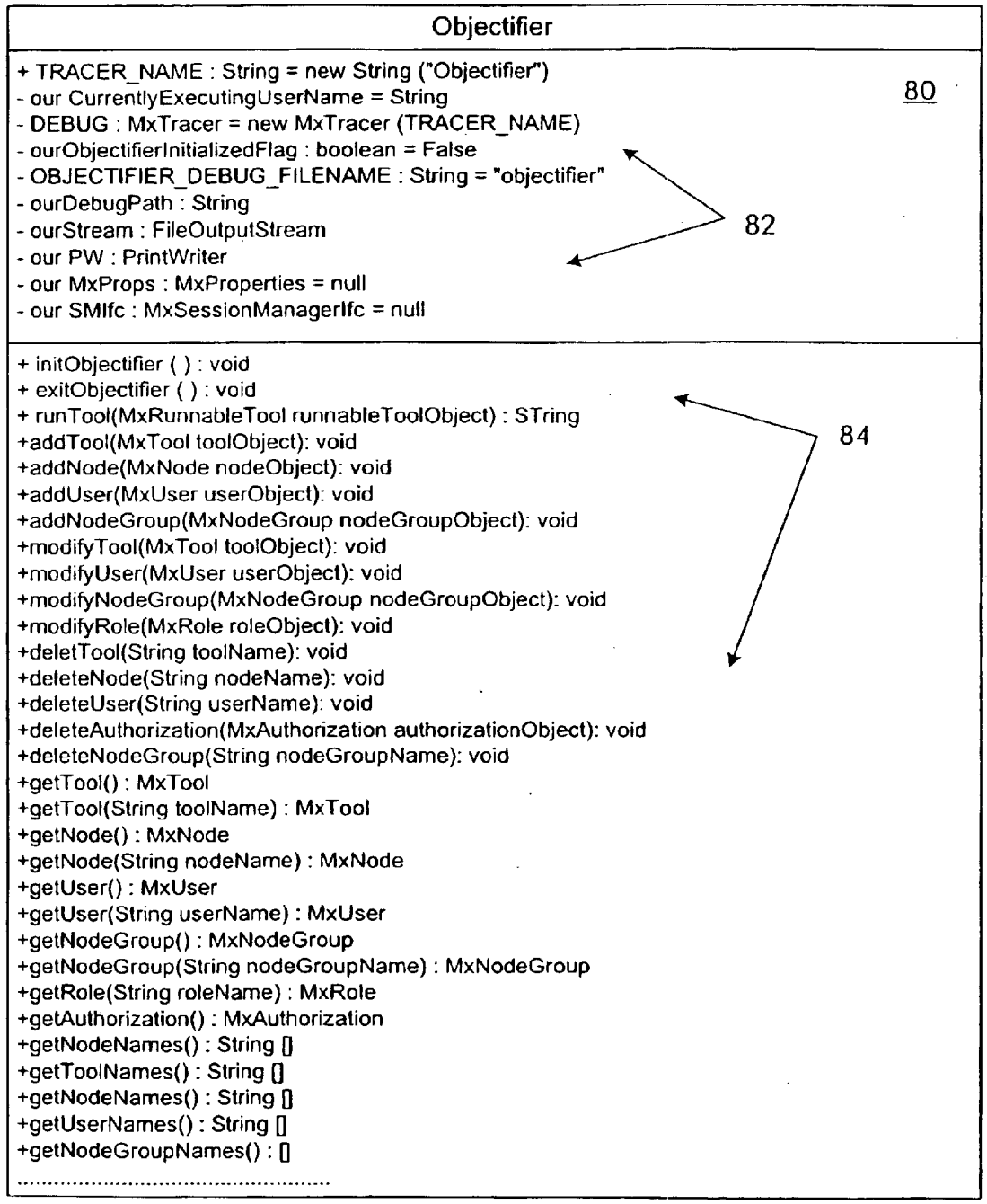
FIG. 4 is a static structure diagram of an embodiment of the mapping layer.

FIG. 4 illustrates a static structure diagram 80 of an exemplary embodiment of the Objectifier 40 for use in the computer system 10 shown in FIG. 1. The Objectifier 40 is preferably a component of the SCM 12 software that maps procedural C++ code to object-oriented Java via entry-points accessible by C++ method invocations. As seen in FIG. 4, the static structure diagram 80 illustrates certain Objectifier data 82 and pass-through interfaces or entry-points 84 (corresponding to the entry-points 401 in FIGS. 2a and 2b).

The Objectifier data 82 may include, for example, various data that the Objectifier 40 and external sources (e.g., CLIs and GUIs) may utilize when the Objectifier 40 is running. For example, the Objectifier data 82 may include a variable (e.g., ourCurrentlyExecutingUserName) in which the Objectifier 40 saves the current OS user login name so that the Objectifier 40 can service requests from, for example, the GUI that require knowledge of the currently logged in OS user. The Objectifier data 82 may include a variable (e.g., ourObjectifierInitializedFlag) that contains data (e.g., true or false) that indicates whether the Objectifier 40 is initialized. This variable is preferably set to false during class loading and to true when, for example, the GUI calls the initObjectifier method.

Moreover, the Objectifier data 82 may include an Objectifier 40 tracer name (e.g., TRACER_NAME) for which an external CLI can query a base tracer object to modify the Objectifier's tracing level (i.e., the level of monitoring of the Objectifier 40 for exceptions, etc.). Additionally, the Objectifier data 82 may include a variable (e.g., DEBUG) that identifies an object used by the Objectifier 40 to log debug output to the Objectifier 40 trace file. The Objectifier 40 trace file name may be contained in another variable (e.g., OBJECTIFIER_DEBUG_FILENAME) that may be included in the Objectifier data 82.

Further, the Objectifier data 82 may include a variable (e.g., MxSessionManagerIfc ourSMIfc) that identifies a Session Manager interface object. When the Objectifer 40 needs to access a SCM 12 domain manager, the Objectifier 40 preferably queries the Session Manager interface object for a particular interface for the SCM 12 domain manager. Likewise, the Objectifier data 82 may include a cached version (e.g., ourMxProps) of a SCM 12 properties file from which to obtain IP port numbers, service names, debug flag values, etc.

The entry-points 84 comprise methods that may be invoked by an executed C++ GUI 42 callback or by the C++ proxy object 43. The entry-points 84 are shown in the following format: +method name (parameter, if any): returned data. For example, +addUser(MxUser userObject) :void is a method with the method name addUser, the parameter MxUser userObject, which requires that an addUser invocation include the name of the MxUser object 48 that is to be added, and a returned data "void" (i.e., no data is returned to the C++ process space 44). Likewise, +getTool( ): MxTool is a method named getTool with no parameters, and a MxTool Java object 48 as the returned data (i.e., the MxTool Java object 48 instance data will be passed to the C++ process space 44 so that the MxTool Java object 48 may be proxied in the C++ process space 44).

For certain accessor methods (e.g., getTool( )), if a parameter value is absent, the invoked accessor method will return an empty object (e.g., an empty tool object). Such a method invocation is made, for example, in order to create a new tool, user, node, node group or role object. If a parameter value is present (e.g., getTool(String toolName)), the invoked accessor method will return a specific object indicated by the parameter value (e.g., a specific tool indicated by toolName).

Accordingly, a C++ GUI 42 in the computer system 10 may issue method calls (e.g., by executing a callback) corresponding to any of the entry-points 84 shown in the static structure diagram 80. In order to successfully enter an entry-point 84 of the embodiment of the Objectifier 40 shown, the C++ GUI 42 method call includes one of the method names and associated parameters (if any) shown. When the embodiment of the Objectifier 40 receives one of the method names and associated parameters (if any) shown in FIG. 4, the Objectifier 40 executes an algorithm (i.e., code) associated with the method identified by the received method name.

FIG. 5 depicts a sequence diagram 100 illustrating an exemplary process utilizing the embodiment of the Objectifier 40 illustrated by the static structure diagram in FIG. 4. The process shown creates a new user of the SCM 12. As seen in FIG. 5, the process for creating a new user of the SCM 12 includes a plurality of C++ GUI 42 method calls to the Objectifier 40 and a plurality of executed method algorithms corresponding to the entry-points 84 invoked by the C++ GUI 42 method calls.

The sequence diagram 100 includes boxes representing the C++ GUI 42 (or, alternatively the C++ proxy object 43), the Objectifier 40, and a series of implementation and utility Java classes 102. Time-lines 112 descend from each of these boxes, representing the continuous running of the C++ GUI 42, Objectifier 40 and the Java classes 102. The Java classes 102 include an implementation class MxOS (a Java object instantiated in the JVM 50 for accessing operating system data), remote utility classes NodeManager, UserManager, RoleManager and SecurityManager (object managers 49 housed in a domain manager and present in remote JVMs 50' and accessible with RMI), and MxUser and MxAuthorization implementation classes (first-class Java objects 48 instantiated in the JVM 50).

The sequence diagram 100 also includes method call-lines 104 representing Objectifier 40 methods invoked (with necessary JNI API calls to access the Objectifier 40 via the JNI 46 boundary) by executed C++ GUI 42 callbacks (or, alternatively, by the C++ proxy object 43 in response invocations by executed C++ GUI 42 callbacks) and utility and implementation class methods and RMIs invoked by the Objectifier 40. The relative vertical position of the method call lines 104 indicates the sequential order in which the Objectifier 40 or utility and implementation class 102 methods are invoked; the sequence starts at the top and moves to the bottom of the sequence diagram 100. Note that "names" (e.g., user names, node names, etc.) are generally id numbers (id#s) mapped to name strings; the C++ GUI 42 preferably displays the name strings to the user while the classes use the id#s to identify the Java objects 48 associated with the "names".

As seen in FIG. 5, the first method call-line 104 represents the invocation of an Objectifier method initObjectifier( ). The initObjectifier( ) method initializes an instance of the Objectifier 40 in the JVM 50 with which the C++ GUI 42 interacts. Preferably, the initObjectifier( ) method is invoked during the C++ GUI 42 startup code sequence. Indeed, the first four method call-lines 104 issuing from box representing the C++ GUI 42, including the initObjectifier( ) method call-line 104, represent Objectifer 40 methods preferably invoked during the C++ GUI 42 startup code sequence.

When initialized, the Objectifier 40 retrieves, from the operating system ("OS"), the login name (i.e., the userid#) of the user currently using the C++ GUI 42 to interact with the SCM 12. This retrieval is represented by a getCurrentLoginName( ) method call-line 104. The implementation class MxOS 102 is an implementation class instantiated in the JVM 50 to facilitate accessing data from the OS. As such, the Objectifier 40 invokes the MxOS method getCurrentLoginName( ) to retrieve the name of the current user.

A getCurrentUser( ) method call-line 104 illustrates the C++ GUI 42 invocation of an Objectifier 40 method to retrieve the userid # of the current user. A isOSUser( ) method call-line 104 illustrates the C++ GUI 42 invocation of an Objectifier 40 method that determines whether the current user is a registered OS user. If the current user is not a registered OS user, the getCurrentLoginName( ) invoked above will not return a name for the current user and the isOSUser( ) method will return a boolean false. If the isOSUser( ) returns a false, the C++ GUI 42 will display an error message to the current user and will not continue with the If the isOSUser( ) returns a true, the process continues. A getUser( ) method call-line 104 illustrates the invocation of an Objectifier method that returns instance data of a Java user object 48 (e.g., a MxUser object 48) that represents a SCM 12 user. Here, the getUser( ) method is invoked with the name of the current user. Consequently, if the current user is a SCM 12 user, the getUser( ) method will return the instance data of the MxUser object 48 that represents the current user to the C++ process space 44.

As shown by the read( ) method call-line 104, the code associated with the getUser( ) method causes the Objectifier 40 to invoke a UserManager utility class 102 read( ) method via a RMI, since the UserManager utility class 102 is in a remote JVM. If the current user is a SCM 12 user, a populated MxUser object 48 will already exist for the current user and the UserManager is accessed to retrieve this MxUser object 48. Accordingly, the read( ) method will return the instance data of the current user's MxUser object 48. If the current user is not a SCM 12 user, a MxUser object 48 will not exist for the current user and the read( ) method (as well as the getUser( ) method above) will generate an exception caught by the Objectifier 40. If no instance data is returned or if the attributes of the current user's MxUser object 48 show that the current user is not authorized to add new users (e.g., the current user does not have the SCM privilege (SCM privileges control access to the structure of the SCM itself) that allows adding of SCM 12 users), the process shown 21 in FIG. 5 will not continue and an appropriate error message will be displayed by the C++ GUI 42.

The four methods described above are preferably invoked by the C++ GUI 42 startup process code. In other words, when a user starts a C++ GUI 42 in order to access and perform a task (e.g., add a SCM 12 user) in the SCM 12, the C++ GUI 42 initializes the Objectifier 40, gets the current user's userid#, determines if the current user is a registered OS user, and gets the current user's MxUser Java object 40 to determine whether the current user is an SCM 12 user and whether the current user has the SCM privilege to perform the task (e.g., add a SCM 12 user) on the SCM 12. If the current user is so privileged, the C++ GUI 42 will continue to execute callbacks in order to facilitate performance of the task.

Accordingly, the C++ GUI 42 will prompt the current user to enter the name of the new SCM 12 user that the current user wants to add. In response to the entered name, the C++ GUI 42 preferably executes a callback to determine whether the entered name is an existing SCM 12 user. The executed C++ GUI 42 callback in turn invokes an Objectifier 40 method to determine whether the entered name is a defined SCM user name, as shown by the isDefinedUser( ) method call-line 104 in FIG. 5. As with all the C++ GUI 42 method invocations shown in FIG. 5 and discussed herein, alternatively, the executed callback may invoke a C++ proxy object 43 method that would in turn invoke the Objectifier 40 method shown (i.e., isDefinedUser( )) and the necessary JNI API call.

Since the User Manager utility class 102 (e.g., MxUserManager) maintains the MxUser Java objects 48 for existing SCM 12 users, the code associated with the isDefinedUser( ) method invokes a User Manager method (shown by the isNameDefined( ) method call-line 104) to determine if the entered name is associated with an existing MxUser object 48. The isNameDefined( ) method preferably returns a boolean true if the entered name is associated with an existing MxUser object 48 and a boolean false otherwise. The isDefinedUser( ) method returns the result to the C++ process space 44.

If the entered name is not associated with an existing MxUser object 48 (i.e., the name entered in the C++ GUI 42 by the current user is not an existing SCM 12 user's name), the C++ GUI 42 callback invokes an Objectifier 40 method (shown by the getUser( ) method call-line 104) to get an empty MxUser object 48 with which to construct a new SCM 12 user. The code associated with the getUser( ) method invokes a constructor method MxUser( ) on the MxUser class 102. The MxUser( ) method instantiates an instance of the MxUser class, creating an empty MxUser object 48, and returns the MxUser object 48 instance data to the Objectifier 40. The getUser( ) method returns this instance data to the C++ process space 44 so that it may be proxied.

Referring to FIG. 5, the getUserAttributes( ) method call-line 104 illustrates the invocation of an Objectifier 40 method to retrieve the new SCM 12 user's attributes. In order to be added as a SCM 12 user, the new SCM 12 user must be a registered OS user. As such, the getUserAttributes( ) method invokes a MxOS class 102 method to retrieve OS user data associated with the entered name (passed by the C++ GUI 42). The OS user data may include, for example, phone numbers, email addresses and userid#s. If the entered name is a registered OS user, the getOSUserData( ) method returns OS user data associated with the entered name. If the entered name is not a registered OS user, no OS user data will be returned and the entered name will not be added as a new SCM 12 user.

A getNodeNames( ) method call-line 104 illustrates invocation of an Objectifier 40 method to retrieve names for nodes that the current user has selected for the new SCM 12 user. Preferably, the C++ GUI 42 presents a list of Nodes for which the current user may select to give the new SCM user 12 authorizations. The selected node names are passed to the Objectifier 40 with the getNodeNames( ) invocation. As shown by the list( ) method call-line 104, the code associated with the getNodeNames( ) method invokes a Node Manager method, via a RMI, to list and return the names for the selected nodes. The Node Manager class 102 (e.g., MxNodeManager) is a utility class that manages the objects that represent the nodes 16 of the SCM 12.

A getRoleNamesAndIDs( ) method call-line 104 illustrates invocation of an Objectifier 40 method to retrieve names and id#s for roles that may be selected for the new SCM 12 user. The code associated with the getRoleNamesAndIDs( ) method invokes a Role Manager method (shown by the second list( ) method in FIG. 5), via a RMI, to list and return the names and id#s for the roles. The Role Manager class 102 (e.g., MxRoleManager) is a utility class that manages the objects that represent the roles of the SCM 12.

For each SCM 12 user, there is a user object (e.g., the MxUser object 48) and zero or more Java authorization object(s) 48 (e.g., MxAuthorization Java objects 48) that define the nodes and roles that the SCM 12 user is authorized to access. Accordingly, as shown in FIG. 5, a getAuthorization method call-line illustrates the invocation of an Objectifier 40 method to create a new authorization (e.g., a role and a node) for the new SCM 12 user. Preferably, the getAuthorization method is invoked for each authorization created for the new SCM 12 user (i.e., each role and node, etc.). An MxAuthorization method call-line 104 illustrates that the code associated with the getAuthorization method invokes a MxAuthorization constructor method on the MxAuthorization class, instantiating an instance of an empty MxAuthorization Java object 48. The getAuthorization method returns the instance data of the MxAuthorization Java object 48 to the C++ process space 44 so that the MxAuthorization Java object 48 may be proxied.

An addUser( ) method call-line 104 illustrates the invocation of an Objectifier 40 method to add the new SCM 12 user to the User Manager. Instance data for the MxUser object 48, and user data, such as the new SCM 12 user's OS user data retrieved above and the userid of the current user, and the identifiers of the authorizations created above, are passed with the addUser( ) method invocation to fill-in the new, empty MxUser object 48, which was created as described above. Preferably, the C++ GUI 42 fills in an empty MxUser object 48 (e.g., by invoking mutator methods via the C++ proxy), with this instance data, user data and the identifiers, and passes a reference to the Java object to the Objectifier 40 with the addUser( ) invocation. Consequently, the Objectifier 40 invokes the User Manager add( ) method, via a RMI, to add the filled-in MxUser object 48 to the User Manager.

As shown in FIG. 5, the saveAuthorizations( ) method call-line 104 illustrate the invocation of an Objectifier 40 method, and in turn, a Security Manager method, via a RMI, to save the filled-in MxAuthorization Java objects 48 created above for each authorization of the new SCM 12 user. The instance data of the filled-in MxAuthorization Java objects 48 and the data identifying the authorizations selected are passed with the saveAuthorizations( ) method invocations. The Security Manager (e.g., MxSecurityManager) maintains the MxAuthorization Java objects 48.

Other processes utilizing the embodiment of the Objectifier 40 shown in FIG. 4 operate similarly to the process shown in FIG. 5. I.e., the C++ GUI 42 callbacks are coded with procedural code for a step-by-step process to add, delete, store, etc. a user, node, role, etc. by invoking Objectifier 40 methods (directly or through the C++ proxy object 43) that execute the Java object creation and RMIs necessary to complete the process in object-oriented Java.

According to this same principal of operation, FIG. 6 depicts another sequence diagram 200 illustrating an exemplary process utilizing the embodiment of the Objectifier 40 shown in FIG. 4. The process shown by FIG. 6 is for adding a new node 16 to the SCM 12. The sequence diagram 200 includes boxes representing the C++ GUI 42 (or, alternatively the C++ proxy object 43), the Objectifier 40, and a series of implementation and utility Java classes 102. Some of the method invocations, such as most of the methods discussed above that are invoked during the C++ GUI 42 startup code process, are omitted from the sequence diagram 200 of FIG. 6. Repetitive method invocations, such as initObjectifier( ) and getCurrentUser( ), are not discussed again.

The sequence diagram 200 in FIG. 6 includes method invocations that may not be invoked every time a new node 16 is added. For example, the a new node 16 may be added by invoking getNode( ), isValidNodeName( ), isDefinedNodeName( ) and addNode( ) Objectifier 40 methods described below. Likewise, if a user creating a new node 16 wishes to add the node to a node group 16, getNodeGroupNames( ) and ModifyNodeGroup( ) Objectifier 40 methods described below may also be invoked. As with FIG. 5, "names" (e.g., user names, node names, etc.) are generally id numbers (id#s) mapped to name strings; the C++ GUI 42 preferably displays the name strings to the user while the classes use the id#s to identify the Java objects 48 associated with the "names".

A getNode( ) method call-line 104 illustrates the invocation of an Objectifier 40 method that returns an instance of a Java node object 48 (e.g., a MxNode Java object 48) that represents a node 16. The code associated with the getNode( ) method invokes a constructor method MxNode( ) of the MxNode class 102. The MxNode( ) method instantiates an instance of the MxNode class, creating an empty MxNode object 48, and returns the MxNode object 48 instance data to the Objectifier 40. The getNode( ) method returns this object to the C++ process space 44 so that it may be proxied.

An isValidNodeName( ) method call-line 104 illustrates the invocation of an Objectifier 40 method to determine if a name, entered by the current user of the C++ GUI 42, is a valid name for a node 16. Preferably, the SCM 12 has certain syntax rules for valid node 16 names that need to be satisfied. A node 16 name is preferably represented by a Java node name object 48 (e.g., a MxNodeName Java object 48). As seen by a MxNodeName( ) method call-line, the Objectifier 40 attempts to determine if the entered name is a valid node 16 name by invoking a MxNodeName implementation class 102 constructor method to create a MxNodeName object 48 with the entered name. The Objectifier 40 passes the entered name with the MxNodeName( ) invocation and if the entered name is a valid node 16 name, the MxNodeName implementation class 102 creates a MxNodeName object 48 with the entered name. If the MxNodeName object 48 is created, a Boolean true is returned to the C++ process space 44. Otherwise, the C++ GUI 42 preferably displays an error message to the current user and the process ends until a valid node 16 name is entered.

An isDefinedNodeName( ) method call-line 104 illustrates the invocation of an Objectifier 40 method that determines whether a node 16 already exists. This method may be invoked after the entered name has been determined to be valid, as described above. A name is passed to the Objectifier 40 with the isDefinedNodeName( ) method invocation. Since the Node Manager utility class 102 maintains existing MxNode objects 48, the Objectifier 40 invokes a Node Manager method, via a RMI, to determine if a MxNode object 48 with the same name already exists. This Node Manager method invocation is shown by the isDefined( ) method call-line 104. The isDefined( ) method returns a boolean true or false, which is in turn, passed to the C++ process space 44 by the isDefinedNodeName( ) Objectifier 40 method.

A getNodeNames( ) method call-line 104, seen in FIG. 6, illustrates the invocation of an Objectifier 40 method to return certain node 16 names (e.g., a list of all node 16 names). Associated with the getNodeNames( ) method is code that invokes a Node Manager method, via a RMI, that retrieves a list of specified node 16 names from the Node Manager utility class 102. The C++ GUI 42 may execute callback code to get certain node 16 names if, for example, the current user indicated that he/she wants to create a new node group 18 with the new node 16 and existing nodes 16. Instance data describing the MxNodeName object(s) 48 for the listed node(s) 16 is preferably returned to the C++ process space 44.

A getNodeGroupNames( ) method call-line 104 illustrates the invocation of a similar Objectifier 40 method to return certain node group 18 names (e.g., a list of all node group 18 names). The getNodeGroupNames( ) method functions similarly to the getNodeNames( ) method, only a Node Group Manager utility class 102 (e.g., a MxNodeGroupManager) method is invoked, via a RMI, to retrieve a list of specified node group 18 names. The C++ GUI 42 may execute callback code to get certain node group 18 names if, for example, the current user indicated that he/she wants to add the new node 16 to an existing node group 18. Instance data describing the MxNodeGroupName object(s) 48 for the listed nodes group(s) 18 is preferably returned to the C++ process space 44.

A getUserNames( ) method call-line 104, shown in FIG. 6, illustrates the invocation of a Objectifier 40 method to return certain user names (e.g., a list of all SCM 12 user names). The getUserNames( ) method functions similarly to the getNodeNames( ) method and getNodeGroupNames( ) method described above, only a User Manager utility class 102 method is invoked, via a RMI, to retrieve a list of specified SCM 12 user names. The C++ GUI 42 may execute callback code to get certain SCM 12 user names if, for example, the current user indicated that he/she wants to enable certain users to access the new node 16. Instance data describing the MxUserName object(s) 48 for the listed SCM 12 users is preferably returned to the C++ process space 44.

A getRoleNamesAndIDs( ) method call-line 104 illustrates invocation of an Objectifier 40 method to retrieve names for roles that may be selected as authorized to be utilized on the new node 16. As discussed above with reference to FIG. 5, the code associated with the getRoleNamesAndIDs( ) method invokes a Role Manager method, via a RMI, to list and return the names for the roles. The read( ) method call-line illustrates that the Objectifier 40 loops to get the MxRole objects from which it extracts the id#s for the SCM 12 roles. The C++ GUI 42 may execute callback code to get certain SCM 12 role names and ids if, for example, the current user indicated that he/she wants to enable certain roles to be utilized on the new node 16. Preferably, the C++ GUI 42 uses displays the role names to the user and uses the role ids (and userids, node ids and node group ids) to build the authorization objects.

An addNode( ) method call-line 104 illustrates invocation of an Objectifier 40 method to store the new node 16 with the Node Manager utility class 102. Instance data for the MxNode object 48, and node data, such as instance data of the MxNodeName object 48 created as described above and the creating user's userid in a createdBy field of the MxNode object 48, are passed to the Objectifier 40 with the addNode( ) method invocation which was created as described above. Consequently, the Objectifier 40 invokes the Node Manager add( ) method, via a RMI, to add the filled-in MxNode object 48 to the Node Manager. Subsequently, the new node 16 may be accessed by accessing the new filled-in MxNode object 48 from the Node Manager.

A getNodeGroup( ) method call-line 104 illustrates invocation of an Objectifier 40 method to create a new node group 16. As seen in FIG. 6, associated with this method is a constructor method MxNodeGroup that the Objectifier 40 invokes in the MxNodeGroup implementation class 102. This constructor method instantiates an empty instance of an MxNodeGroup object 48 and passes the empty MxNodeGroup object 48 to the Objectifier 40. The Objectifier 40 passes this empty object to the C++ process space 44 so that the new MxNodeGroup object 48 may be proxied. If the current user decides to create a new node group 16, the MxNodeGroup object 48 is filled in via a C++ proxy with data identifying the nodes 16 in the new node group 18. Subsequently, a reference to the MxNodeGroup object 48 may be passed through an Objectifier 40 addNodeGroup( ) method invocation (not shown) and stored with the Node Group Manager utility class 102.

A modifyNodeGroup( ) method call-line 104 illustrates invocation of an Objectifier 40 method to modify an existing node group 16. The associated code in turn invokes a Node Group Manager utility class 102 method to add the new node 16 to an existing node group 18 (shown, in FIG. 6, by the modify( ) method call-line 104). Data identifying the new node 16 (e.g., the new node 16 name) and the node group 16 being modified (e.g., the node group 18 name) is preferably passed to the Node Group Manager.

A getAuthorization( ) method call-line 104 illustrates invocation of an Objectifier 40 method to create a new authorization (e.g., if the current user authorized a certain SCM 12 role to be utilized on or certain SCM 12 users to access the new node 16). As noted above with regard to FIG. 5, this method may be repeated for each new authorization to be created. The associated code in turn invokes a MxAuthorization constructor method on the MxAuthorization implementation class 102, instantiating an instance of an empty MxAuthorization Java object 48. The getAuthorization( ) method returns the instance of the MxAuthorization Java object 48 to the C++ process space 44 so that the MxAuthorization Java object 48 may be proxied.

The last method call-line 104 in the sequence diagram 200 shown in FIG. 6, a saveAuthorizations( ) method call-line 104 illustrates the (repeated, if necessary) invocation of an Objectifier 40 method, and in turn, a Security Manager method, via a RMI, to save the filled-in MxAuthorization objects 48 for each new authorization created. The instance data of the filled-in MxAuthorization Java objects 48 and the data identifying the authorizations selected are passed with the saveAuthorizations( ) method invocations.

As illustrated by the exemplary sequence diagrams 100, 200 in FIGS. 5 and 6, the Objectifier 40 is a component of the SCM 12 software that acts as a layer between the C++ process space 44 and the method invocations and RMIs necessary in the object-oriented JVM 50. As shown, the Objectifier 40 consolidates the Java object 48 creations and RMIs that are used to conduct a process in Java. The Objectifier 40 maps the procedural C++ code of the C++ GUI 42 callbacks to the Java object-oriented utility and implementation classes.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. Those skilled in the art will recognize that these and other variations are possible within the spirit and scope of the invention as defined in the following claims and their equivalents.

What is claimed is:

1. A method for mapping procedural code to object-oriented classes, comprising:

starting a graphical user interface ("GUI") in a procedural programming language process space, wherein a user enters a command through the GUI;

initializing a mapping layer in an object-oriented programming language process space, wherein the mapping layer comprises entry-points that have corresponding algorithms that invoke object-oriented class instantiation methods and/or remote method invocations ("RMIs");

executing a GUI callback in response to the command, wherein the GUI callback comprises procedural code and wherein executing a GUI callback in response to the command comprises:

invoking one of the entry-points, wherein the object-oriented programming language is Java, the mapping layer is accessed through a Java Native Interface ("JNI") and invoking one of the entry-points comprises:

invoking a JNI application programming interface ("API") call, wherein the JNI API call invokes one of the entry-points;

the mapping layer executing an algorithm corresponding to the invoked entry-point; and wherein the mapping layer is proxied in the procedural programming language process space by a proxy object that includes proxy object methods corresponding to the entry-points, and executing a GUI callback further comprises:

invoking one of the proxy object methods, wherein the invoked proxy object method performs the invoking one of the entry-points.

2. The method of claim 1, wherein executing the algorithm comprises invoking a class instantiation method.

3. The method of claim 1, wherein executing the algorithm comprises invoking an RMI.

4. The method of claim 1, wherein the procedural programming language is C++.

5. The method of claim 1, wherein the entry-points are methods of the mapping layer.

6. The method of claim 1, further comprising returning data to the procedural programming language process space.

7. A computer readable medium containing instructions for mapping procedural code to object-oriented classes, by:

starting a graphical user interface ("GUI") in a procedural programming language process space, wherein a user enters a command through the GUI;

initializing a mapping layer in an object-oriented programming language process space, wherein the mapping layer comprises entry-points that have corresponding algorithms that invoke object-oriented class instantiation methods and/or remote method invocations ("RMIs");

executing a GUI callback in response to the command, wherein the GUI callback comprises procedural code and wherein executing a GUI callback in response to the command comprises:

invoking one of the entry-points, wherein the object-oriented programming language is Java, the mapping layer is accessed through a Java Native interface ("JNI") and invoking one of the entry-points comprises:

invoking a JNI application programming interface ("API") call, wherein the JNI API call invokes one of the entry-points;

the mapping layer executing an algorithm corresponding to the invoked entry-point; and wherein the mapping layer is proxied in the procedural programming language process space by a proxy object that includes proxy object methods corresponding to the entry-points, and executing a GUI callback further comprises:

invoking one of the proxy object methods, wherein the invoked proxy object method performs the invoking one of the entry-points.

8. The computer readable medium of claim 7, wherein executing the algorithm comprises invoking a class instantiation method.

9. The computer readable medium of claim 7, wherein executing the algorithm comprises invoking an RMI.

10. The computer readable medium of claim 7, wherein the procedural programming language is C++.

11. A computer system that enables the mapping of procedural code to object-oriented classes, comprising:
  a memory;
  a processor that runs an application, wherein the application generates:
    a graphical user interface ("GUI") in a procedural programming language process space, wherein users enter commands through the GUI; and
    a mapping layer in an object-oriented programming language process space, wherein the mapping layer comprises entry-points that have corresponding algorithms that invoke object-oriented class instantiation methods and/or remote method invocations ("RMIs"); and
  wherein the application includes instructions for:
    executing a GUI callback in response to the command, wherein the GUI callback comprises procedural code and wherein executing a GUI callback in response to the command comprises:
    invoking one of the entry-points, wherein the object-oriented programming language is Java, the mapping layer is accessed through a Java Native Interface ("JNI") and invoking one of the entry-points comprises:
      invoking a JNI application programming interface ("API") call, wherein the JNI API call invokes one of the entry-points;
    the mapping layer executing an algorithm corresponding to the invoked entry-point; and
    wherein the mapping layer is proxied in the procedural programming language process space by a proxy object that includes proxy object methods corresponding to the entry-points, and executing a GUI callback further comprises:
    invoking one of the proxy object methods, wherein the invoked proxy object method performs the invoking one of the entry-points.

12. The computer system of claim 11, wherein the GUI executes callback code in response to an entered command and the executed callback code invokes one of the mapping layer entry-points.

13. The computer system of claim 11, wherein the entry-points are mapping layer methods that are accessed from the procedural programming language process space though application programming interface ("API") calls.

14. The computer system of claim 11, wherein the procedural programming language is C++.

15. The computer system of claim 11, wherein the object-oriented programming language process space is a Java Virtual Machine.

* * * * *